(12) United States Patent
Husain

(10) Patent No.: US 8,467,951 B2
(45) Date of Patent: Jun. 18, 2013

(54) NAVIGATION SYSTEM WITH ALTERNATIVE ROUTE DETERMINATION MECHANISM AND METHOD OF OPERATION THEREOF

(75) Inventor: Aliasgar Mumtaz Husain, Milpitas, CA (US)

(73) Assignee: Telenav, Inc., Sunnyvale, CA (US)

( * ) Notice: Subject to any disclaimer, the term of this patent is extended or adjusted under 35 U.S.C. 154(b) by 595 days.

(21) Appl. No.: 12/774,917

(22) Filed: May 6, 2010

(65) Prior Publication Data

US 2011/0276265 A1 Nov. 10, 2011

(51) Int. Cl.
*G01C 21/26* (2006.01)
(52) U.S. Cl.
USPC ............ 701/117; 701/414; 701/423; 701/431
(58) Field of Classification Search
USPC ................. 701/117–119, 465, 414, 423, 425, 701/428, 431; 340/995.12–995.19
See application file for complete search history.

(56) References Cited

U.S. PATENT DOCUMENTS

| | | | |
|---|---|---|---|
| 5,719,771 A | 2/1998 | Buck et al. | |
| 5,742,922 A | 4/1998 | Kim | |
| 6,298,304 B1 | 10/2001 | Theimer | |
| 6,751,549 B1 | 6/2004 | Kozak | |
| 7,512,486 B2 | 3/2009 | Needham et al. | |
| 8,068,981 B2 * | 11/2011 | Liberto et al. | 701/414 |
| 2001/0014849 A1 | 8/2001 | King et al. | |
| 2005/0107951 A1 | 5/2005 | Brulle-Drews et al. | |
| 2005/0222764 A1 | 10/2005 | Uyeki et al. | |
| 2006/0015249 A1 | 1/2006 | Gieseke | |
| 2008/0177460 A1* | 7/2008 | Blackwood et al. | 701/118 |

OTHER PUBLICATIONS

International Search Report for PCT Application No. PCT/US2011/035244 dated Oct. 28, 2011.

* cited by examiner

*Primary Examiner* — Richard M. Camby (57) ABSTRACT

A method of operation of a navigation system includes: generating a potential route from a current location to a destination; assigning a steady state change indicator to a route characteristic of the potential route for maintaining a steady state of a vehicle; calculating a total steady state change for the potential route based on the steady state change indicator; and determining a selected route based on the potential route with the total steady state change that is the lowest for displaying on a device.

20 Claims, 7 Drawing Sheets

NAVIGATION SYSTEM WITH ALTERNATIVE ROUTE DETERMINATION MECHANISM AND METHOD OF OPERATION THEREOF

TECHNICAL FIELD

The present invention relates generally to a navigation system, and more particularly to a system for providing alternative route determination.

BACKGROUND ART

Portable consumer and industrial electronics provide ever expanding levels of functionality to support modern life. This is especially true for devices such as navigation systems, cellular phones, portable digital assistants, and multifunction devices.

As the popularity of these portable consumer and industrial electronic devices increases, new applications, services, and products are developed to meet the diverse needs of the ever expanding population of users. One existing application is the use of location information to provide navigation and location-based information services, such as a global positioning service (GPS) navigation system, for a mobile device.

Portable electronic devices, such as navigation systems can provide navigation to a location based on a number of factors to meet the needs of a diverse population of users. Portable electronic devices can determine how to navigate to a destination so as to minimize the amount of time needed to travel to the destination or to minimize the distance needed to reach the destination. These devices are also capable of determining how to navigate to a destination so that the use of freeways is maximized or avoided or they can determine how to navigate to the destination so that toll roads are avoided or fuel is conserved.

Thus, a need still remains for a navigation system with an alternative route determination mechanism. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a potential route from a current location to a destination; assigning a steady state change indicator to a route characteristic of the potential route for maintaining a steady state of a vehicle; calculating a total steady state change for the potential route based on the steady state change indicator; and determining a selected route based on the potential route with the total steady state change that is the lowest for displaying on a device.

The present invention provides a navigation system, including: a control unit for generating a potential route from a current location to a destination; a steady state change indicator module, coupled to the control unit, for assigning a steady state change indicator to a route characteristic of the potential route for maintaining a steady state of a vehicle; a calculation module, coupled to the steady state change indicator module, for calculating a total steady state change for the potential route based on the steady state change indicator; and a route determination module, coupled to the calculation module, for determining a selected route based on the potential route with the total steady state change that is the lowest for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some route characteristics in common, for clarity and ease of illustration, description, and comprehension thereof, similar and like route characteristics one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described, such as locations, routes, current speeds, estimated times of arrival, as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "coupling" or "coupled" referred to herein can include any physical or non-physical connecting, joining or linking of a device, module, unit or element of the navigation system.

Figure 1:
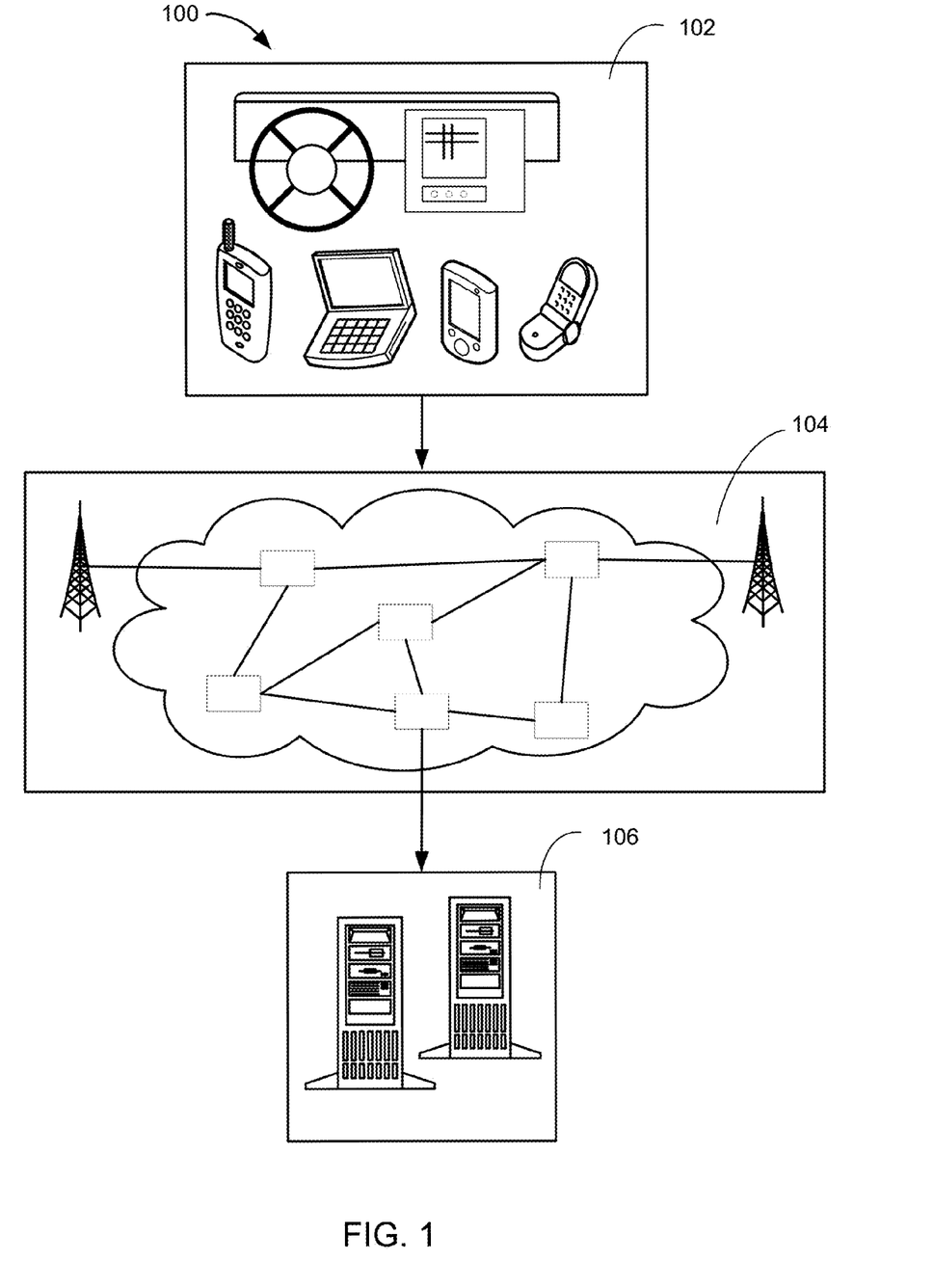
FIG. 1 is a navigation system in an embodiment of the present invention.

Referring now to FIG. 1, therein is shown a navigation system 100 in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can connect to the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
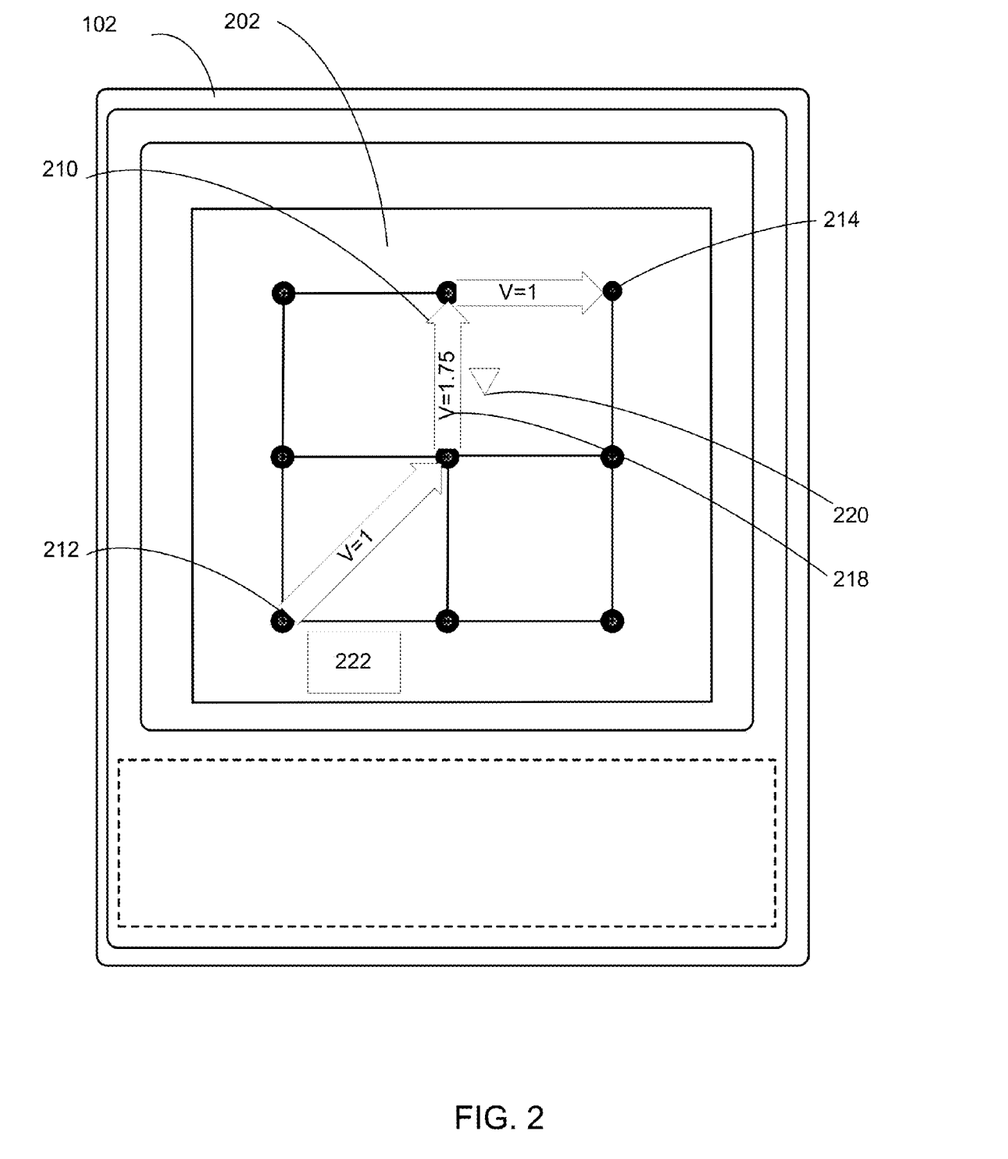
FIG. 2 is a display interface of the first device in a first example of the navigation system of FIG. 1.

Referring now to FIG. 2, therein is shown a display interface 202 of the first device 102 of FIG. 1 in a first example of the navigation system 100 of FIG. 1. FIG. 2 shows a selected route 210 between a current location 212, representing the position of the first device 102, and a destination 214. For illustrative purposes the route selected 210 is displayed on a grid, however, it is understood that the selected route 210 can be displayed as part of any number of visual representations, including street level maps, topographical maps, and satellite images.

The navigation system 100 can determine a total steady state change 222 for the selected route 210 based on steady state change indicators 218 assigned to route characteristics 220 on the selected route 210. The steady state change indicators 218 are numbers that represent the likelihood the route characteristics 220 will cause a deviation from a steady state of the vehicle or person using the navigation system 100 and the severity of that deviation. The steady state is defined as a state in which a person or vehicle is maintaining a constant velocity with little or no acceleration, deceleration, changes in direction, jarring or shaking so that forces caused by acceleration, deceleration, turning, jarring, or shaking that might affect cargo being transported are minimized or eliminated.

The route characteristics 220 are any items or conditions affecting travel along the selected route 210. For example, the route characteristics 220 can include a stop sign, a yield sign, a right or left turn, speed bumps, an unpaved road, a cobblestone road, an one-way street, an uphill grade, a downhill grade, potholes, slow traffic, a downed power line, debris on a road, a cattle crossing, a school zone, an icy road or a toll booth.

The navigation system 100 can also display the total steady state change 222 for the selected route 210 based on the steady state change indicators 218. The total steady state change 222 is a number representing a sum of all of the steady state change indicators 218 on the selected route 210. The navigation system 100 is shown as displaying the steady state change indicators 218, the route characteristics 220, and the total steady state change 222 as an example. The steady state change indicators 218, the route characteristics 220, and the total steady state change 222 need not be displayed or communicated or can be communicated as an audio announcement.

Figure 3:
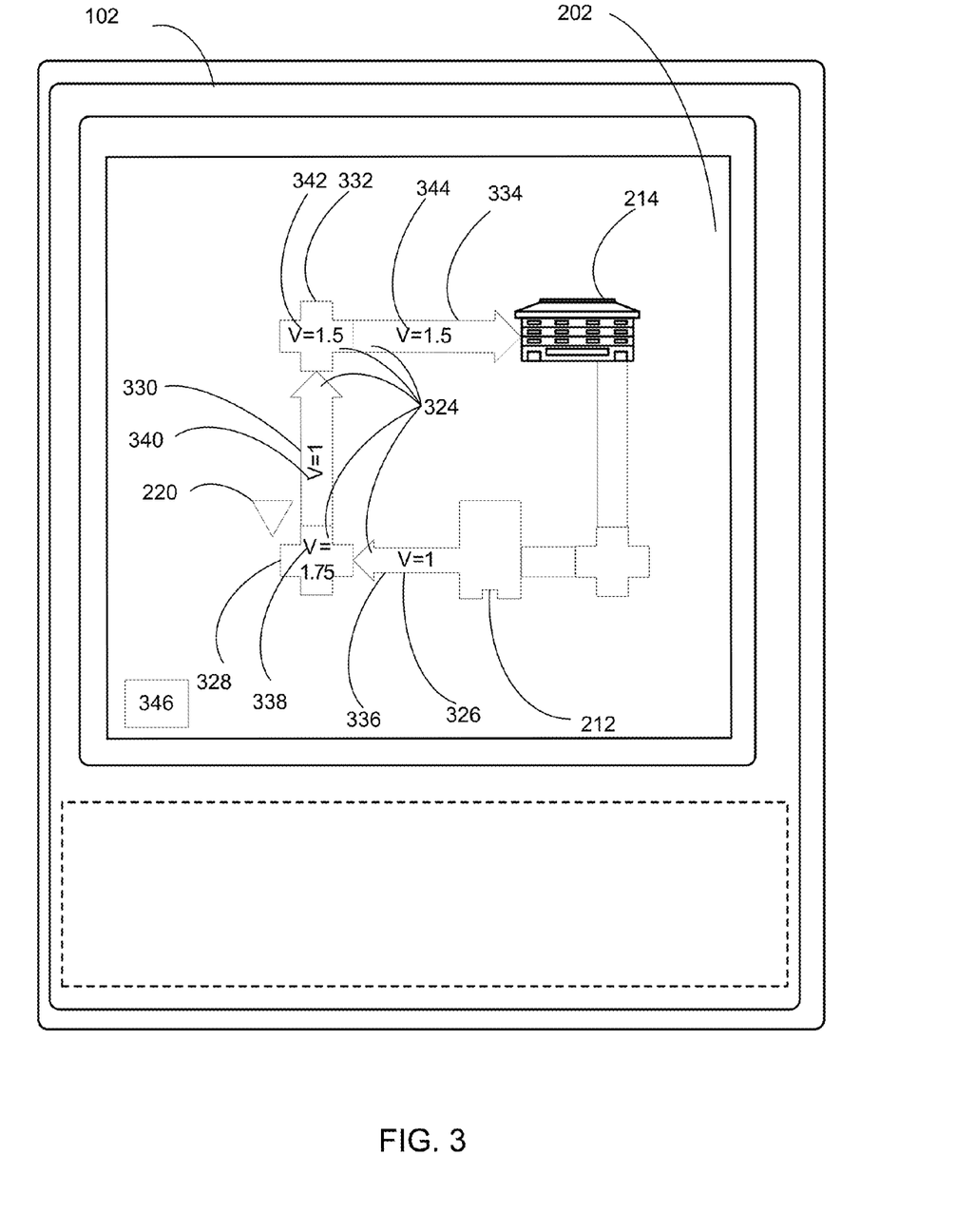
FIG. 3 is the display interface of the first device in a second example of the navigation system of FIG. 1.

Referring now to FIG. 3, therein is shown the display interface 202 of the first device 102 in a second example of the navigation system 100 of FIG. 1. The display interface 202 shows a first route 324 from the current location 212 to the destination 214. The first route 324 can include a first route segment 326, a first intersection 328, a second route segment 330, a second intersection 332 and a third route segment 334.

The steady state change indicators 218 of FIG. 2 can be assigned to the route characteristics 220 of FIG. 2 based on the likelihood the route characteristics 220 for that portion of the first route 324 will cause a deviation from the steady state and the severity of the deviation. For example, the navigation system 100 can assign a first steady state change indicator 336 to the first route segment 326 based on the route characteristics 220 associated with the first route segment 326.

As an example, the first route segment 326 can be assigned the first steady state change indicator 336 of one indicating that the first route segment 326 has conditions whereby a vehicle or person can travel with minimal changes in speed, acceleration, deceleration, direction, jarring, shaking, or vibration. The first steady state change indicator 336 can indicate that the vehicle or person travelling on the first route segment 326 will not have to deviate or have minimal deviation from the steady state when travelling down the first route segment 326.

As another example, a second steady state change indicator 338 assigned to the first intersection 328 can be one and three quarters indicating that the intersection has, for example, a yield sign. Also for example a third steady state change indicator 340 of one can be assigned to the second route segment 330 indicating that it has conditions whereby a vehicle or person can travel with minimal changes in speed, acceleration, deceleration, direction, jarring, shaking, or vibration.

As a further example, a fourth steady state change indicator 342 of one and one half can be assigned to a second intersection 332 where an unimpeded right turn can be made. An unimpeded right turn is a right turn that is made without stopping. The steady state change indicator 318 of one and a half in this example can indicate that the deviation from the steady state necessary to travel through the right turn is greater than what is necessary to travel down the first route segment 326. As yet another example, a fifth steady state change indicator 344 of one and one half can be assigned to the third route segment 334 indicating, for example, that the third route segment 334 contains a speed bump.

A first total steady state change 346 for the first route 324 can be determined by adding together the first steady state change indicator 336, the second steady state change indicator 338, the third steady state change indicator 340, the fourth steady state change indicator 342, and the fifth steady state change indicator 344. As an example, the first total steady state change 346 for the first route 324 can be six and three quarters.

The first total steady state change 346 of six and three quarters is given as an example, the first total steady state change 346 can be any number that is a sum of the steady state change indicators 218 assigned to the route characteristics 220 found on each segment or intersection of the first route 324. For purposes of illustration the first total steady state change 346 can be twenty, two, one hundred, or eight and two-thirds.

Figure 4:
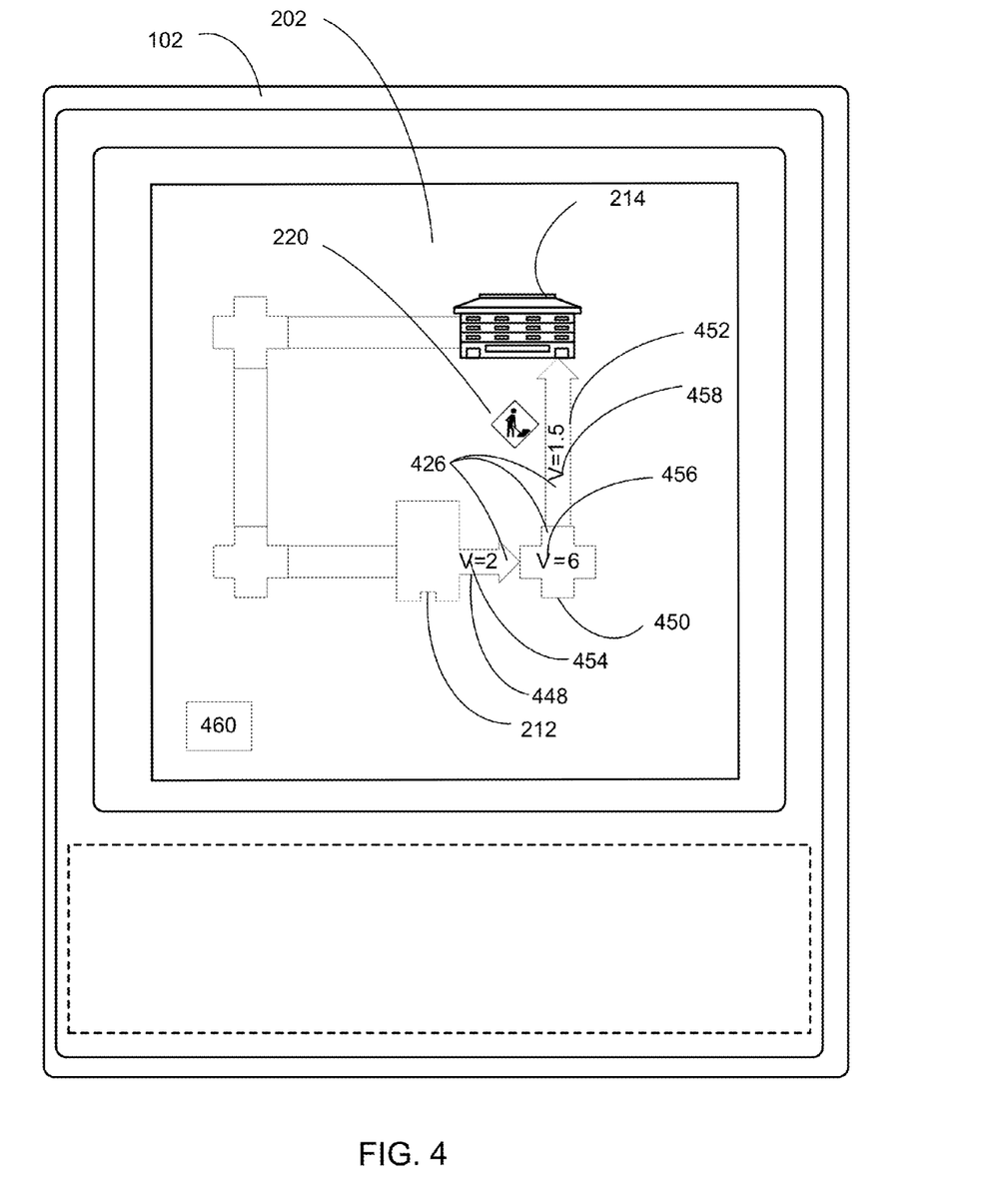
FIG. 4 is the display interface of the first device in a third example of the navigation system of FIG. 1.

Referring now to FIG. 4, therein is shown the display interface 202 of the first device 102 in a third example of the navigation system 100 of FIG. 1. The display interface 202 shows a second route 426 from the current location 212 to the destination 214. The second route 426 can include a fourth route segment 448, a third intersection 450, and a fifth route segment 452.

The navigation system 100 can assign the steady state change indicators 218 of FIG. 2 to the route characteristics 220 on the second route 426. For example, a sixth steady state change indicator 454 can be assigned to the route characteristics 220 of the fourth route segment 448, a seventh steady state change indicator 456 can be assigned to the route characteristics 220 of the third intersection 450, and an eighth steady state change indicator 458 can be assigned to the route characteristics 220 of the fifth route segment 452.

As example, the sixth steady state change indicator 454 can be assigned a value of two indicating that the fourth route segment 448 includes a steep incline. As another example, the seventh steady state change indicator 456 can be assigned a value of six indicating that the third intersection 450 requires a left turn involving a full stop. As a further example the eighth steady state change indicator 458 can be assigned a value of one and one half indicating that there the fifth route segment 452 is somewhat rough do to construction work.

A second total steady state change 460 for the second route 426 can be determined by adding together the sixth steady state change indicator 454, the seventh steady state change indicator 456, and the eighth steady state change indicator 458. As an example, the second total steady state change 460 for the second route 426 can be nine and one half.

The second total steady state change 460 of eight and one half is given as an example; the second total steady state change 460 can be any number that is a sum of the steady state change indicators 218 assigned to the route characteristics 220 found on each segment or intersection of the second route 426. For purposes of illustration the second total steady state change 460 can be eighty-eight, nine, eleven and one third, or negative five.

The second route 426 is depicted as being shorter than the first route 324 of FIG. 3 while the second total steady state change 460 is depicted as being higher than the first total steady state change 346 of FIG. 3 indicating that the second route 426 requires more deviation from the steady state than the first route 324. The navigation system 100 can compare the first route 324 to the second route 426 and determine that the first route 324 is preferable, even though it is longer than the second route 426 because the first total steady state change 346, which is depicted as six and three quarters in this example, is lower than the second total steady state change 460, which is depicted as nine and one half in this example.

Figure 5:
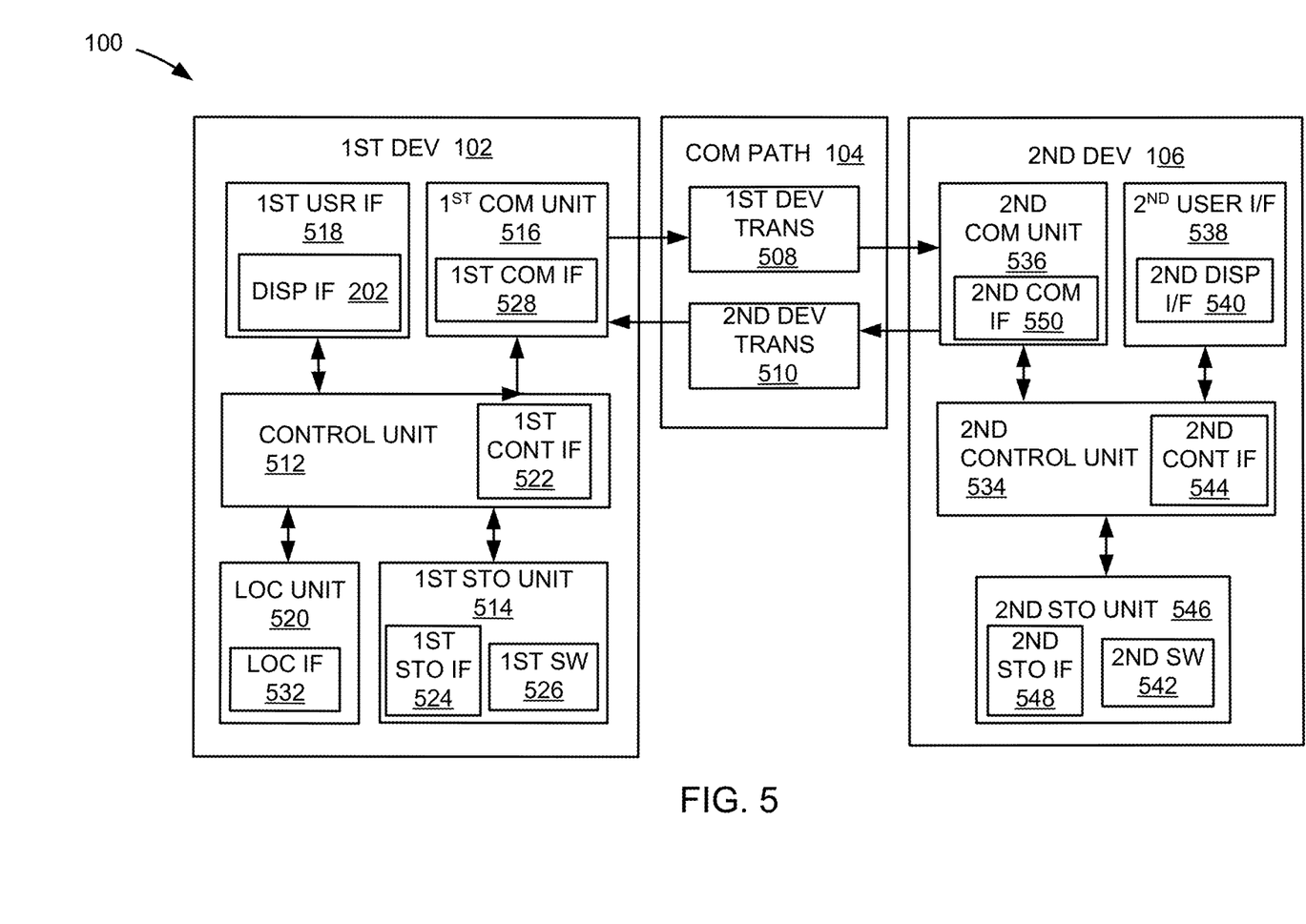
FIG. 5 is a block diagram of the navigation system of FIG. 1 in a second embodiment of the present invention.

Referring now to FIG. 5, therein is shown a block diagram of the navigation system 100 of FIG. 1 in a second embodiment of the present invention. The navigation system 100 can include the first device 102 of FIG. 1, the communication path 104 of FIG. 1, and the second device 106 of FIG. 1.

The first device 102 can communicate with the second device 106 over the communication path 104. The screen shot shown on the display interface 202 described in FIG. 2 can represent the screen shot for the navigation system 100.

The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522.

The first user interface 518 can include the display interface 202. The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs. Examples of the output device of the first user interface 518 can include the display interface 202. The display interface 202 can include a display, a projector, a video screen, a speaker, or any combination thereof.

The first control unit 512 can execute a first software 526 to provide the intelligence of the navigation system 100. The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 of FIG. 1 via the first communication unit 516.

The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof.

The first control unit 512 can include a first control interface 522. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104 of FIG. 1.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The performance, architectures, and type of technologies can also differ between the first device 102 and the first device 102. For example, the first device 102 can function as a single device embodiment of the present invention and can have a higher performance than the first device 102. The first device 102 can be similarly optimized for a multiple device embodiment of the present invention.

For example, the first device 102 can have a higher performance with increased processing power in the control unit 508 compared to the first control unit 512. The storage unit 504 can provide higher storage capacity and access time compared to the first storage unit 514.

Also for example, the first device 102 can be optimized to provide increased communication performance in the first communication unit 516 compared to the communication unit 510. The first storage unit 514 can be sized smaller compared to the storage unit 504. The first software 526 can be smaller than the software 512 of FIG. 5.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512 or the control unit 508.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the location unit 506 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
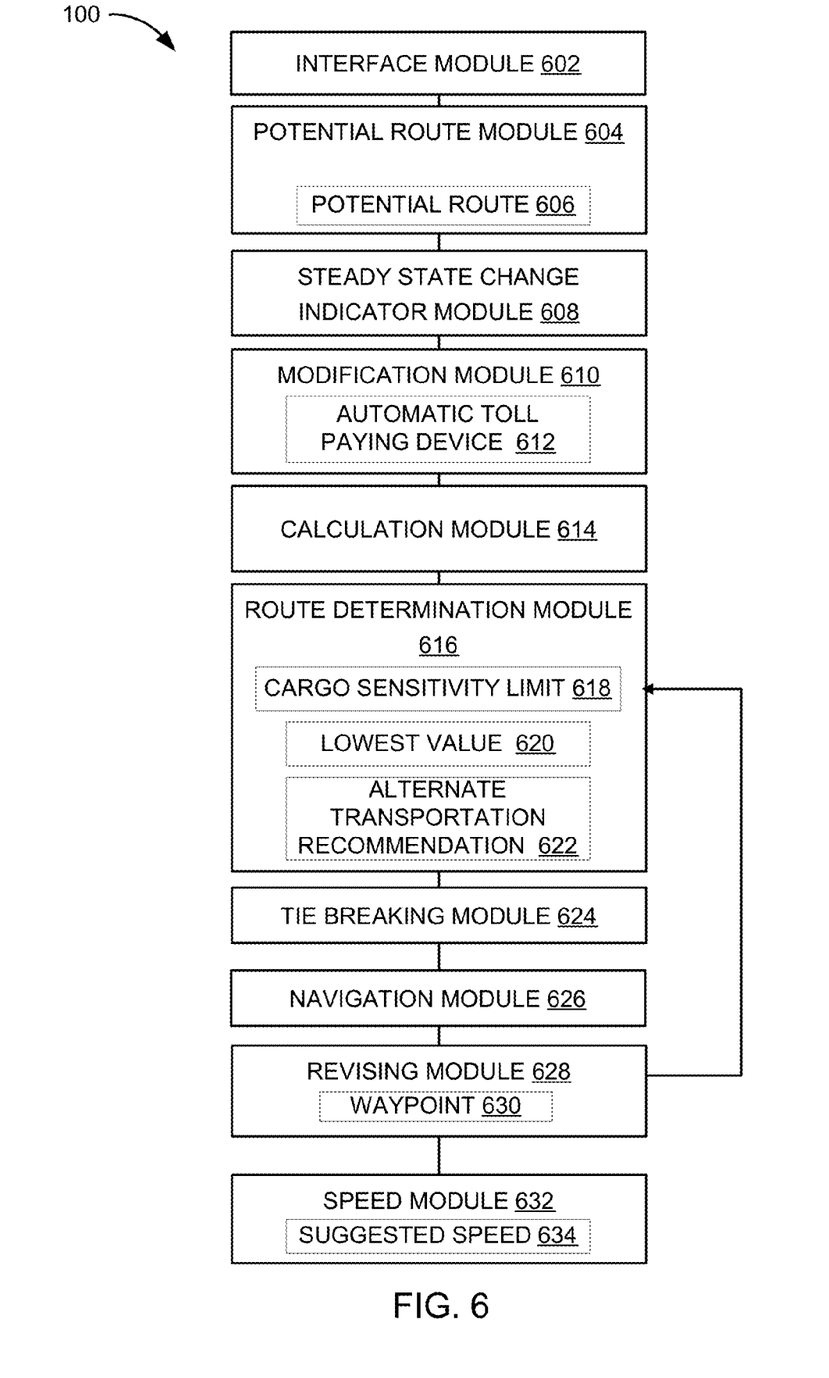
FIG. 6 is a flow of the navigation system of FIG. 1.

Referring now to FIG. 6, therein is shown a flow of the navigation system 100 of FIG. 1. The navigation system 100 depicts an interface module 602, which performs input and/or output functions for receiving and/or sending information. The interface module 602 can receive an input including the destination 214 of FIG. 2. For example, the destination 214 can be "Kifer Road and Lawrence Expressway in Sunnyvale California."

The interface module 602 can be implemented, for example, with the first device 102 of FIG. 1. The interface module 703 can also be implemented, for example by the second device 106 of FIG. 1.

Also for example, the interface module 602 can be implemented with the navigation system 100 of FIG. 5. The interface module 602 can be implemented with the first communication unit 516 of FIG. 5 or the second communication unit 536 of FIG. 5 receiving the input. The first software 526 of FIG. 5 or the second software 542 of FIG. 5 can provide the intelligence for the interface module 602.

The navigation system 100 further depicts a potential route module 604 for determining a route based on roads or paths a vehicle or person can take to travel from a starting location to an ending location. The potential route module 604 can generate any number of possible routes based on roads or paths that the person or vehicle can travel along.

For example, the potential route module 604 can generate a potential route 606 between the current location 212 of FIG. 2 and the destination 214. The potential route 606 can be any road or path that connects the start or the current location 212 with the destination 214. The potential route module 604 can generate any number of alternate versions of the potential route 606 from the current location 212 to the destination 214 using any available road or path including, for example, freeways, surface streets, toll roads, sidewalks, bridges, tunnels, or undefined roads. An undefined road can include an unpaved road such as a dirt or a gravel road.

The potential route module 604 can be implemented, for example, with the first device 102 of FIG. 1. The potential route module 604 can also be implemented, for example, with the second device 106 of FIG. 1.

Also for example, the potential route module 604 can be implemented with the navigation system 100 of FIG. 5. The potential route module 604 can be implemented with the first control unit 512 of FIG. 5 or the second control unit 534 of FIG. 5 determining the potential route 606 from the current location 212 to the destination 214. The first software 526 or the second software 542 can provide the intelligence for the steady state change indicator module 608.

The navigation system 100 further depicts a steady state change indicator module 608 for assigning numerical values to conditions found on roads or paths in order to indicate the affect those conditions can have on the steady state of a vehicle travelling on those roads or paths. The steady state change indicator module 608 can assign numerical values to conditions found on roads or paths based on information regarding traffic conditions, weather conditions, and road conditions extracted from, for example, databases or websites, For example, the steady state change indicator module 608 can assign numerical values to conditions found on a road based on information regarding the flow of traffic on the road extracted from a website or database that can affect the steady state of a person or vehicle travelling along the road. As another example, the steady state change indicator module 608 can assign numerical values to conditions found on the road based on information extracted from a website or database regarding the changes in elevation and the uphill and downhill grades found on the road that can affect the steady state of a person or vehicle travelling on the road. As yet another example the steady state change indicator module 608 can assign numerical values to conditions found on the road based on information extracted from a website or database regarding weather conditions and the effect of the weather conditions on traffic conditions on the road that can affect the steady state of a person or vehicle travelling on the road.

The steady state change indicator module 608 can assign the steady state change indicators 218 of FIG. 2 to the route characteristics 220 of FIG. 2 of the potential route ###. The route characteristics 220 can be assigned the steady state change indicators 218 based on the effect that the route characteristics 220 is likely to have on the velocity and direction of a person or vehicle.

As an example the steady state change indicator module 608 can assign the steady state change indicators 218 of one to the route characteristics 220 of the first route segment 326 of FIG. 3, where a vehicle or person can travel with minimal changes in speed, acceleration, or deceleration. The steady state change indicators 218 of one can indicate that a vehicle or person travelling on the first route segment 326 can maintain the steady state.

As another example, the steady state change indicator module 608 can assign the steady state change indicators 218 of one and one half the route characteristics 220 of the second intersection 332 of FIG. 3, to indicate that an unimpeded right turn can be made at the second intersection 332.

As another example, the route characteristics 220 that are likely to cause partial acceleration or deceleration, such as a change in a speed limit, can be assigned the steady state change indicators 218 of one and a half. As another example, the route characteristics 220 that are likely to cause fast acceleration or deceleration, such as a freeway onramp or off ramp, can be assigned the steady state change indicators 218, such as two, which is greater than the steady state change indicators 218 assigned to the route characteristics 220 that cause the partial acceleration or deceleration.

As a further example, the route characteristics 220 that are likely to cause the vehicle to stop such as, a stop sign, a stop light or a left turn can be assigned the steady state change indicators 218, such as six. As yet another example the route characteristics 220, such as an uphill or downhill grade can be assigned the steady state change indicators 218 based on the grade.

For example, a downhill grade where the grade is equal to the level of friction caused by the road could be assigned the steady state change indicators 218, such as zero. As another example a steeper uphill or downhill grade can be assigned the steady state change indicators 218 greater than the steady state change indicators 218 assigned to a less steep uphill or downhill grade.

As yet another example, the route characteristics 220 that require both stopping and restarting or coming close to a full stop and restart, such as a toll booth or speed bumps, can be assigned the steady state change indicators 218, such as six, where six is significantly greater than the steady state change indicators 218 assigned to the route characteristics 220 that allow a vehicle or person can travel with minimal changes in speed, acceleration, or deceleration. The route characteristics 220 that can cause slowing, jostling or swerving such as roads with pot holes or cobblestones, or unpaved roads can be assigned the steady state change indicators 218, such as two.

The steady state change indicator module 608 can also assign the steady state change indicators 218 to the route characteristics 220, such as a corner, based on the deviation from the steady state needed to travel through the corner. For example, a sharp turn can be assigned the steady state change indicators 218 that are greater than the steady state change indicators 218 for a longer, gentler turn.

The steady state change indicator module 608 can also assign the steady state change indicators 218 to the route characteristics 220 such as slow traffic. The steady state change indicator module 608 can receive current traffic conditions before assigning the steady state change indicators 218 to a segment of a road with slow traffic.

The steady state change indicator module 608 can also assign the steady state change indicators 218 that are infinite or extremely large to the route characteristics 220 that should always be avoided or that should normally be avoided. For example, the route characteristics 220 of the potential route 606 that includes a one-way street can be assigned the steady state change indicators 218 that are infinite where the potential route 606 would require travelling the wrong way down the one-way street.

The steady state change indicators 218 assigned to the route characteristics 220 in each of the instances discussed above is given as an example. The steady state change indicators 218 assigned to the route characteristics 220 can be any number, whole, fractional, or negative. For example the steady state change indicators 218 assigned to the first route segment 326 can be zero, five, one and one third or negative two. As a further example the steady state change indicators 218 assigned to the route characteristics 220, such as a stop sign, can be zero, eight, two and seven tenths or negative four. The steady state change indicators 218 assigned to the route characteristics 220 can be any number so long as the number reflects the deviation from the steady state.

The steady state change indicator module 608 can also assign the steady state change indicators 218 to the route characteristics 220 based on the cargo (not shown) being transported. For example, if the cargo is sensitive to jarring caused by bumps in the road the steady state change indicators 218 assigned the route characteristics 220, such as streets with speed bumps, pot holes, or cobblestones, can be larger than the steady state change indicators 218 assigned to the route characteristics 220 when cargo that is not sensitive to jarring is being transported.

As another example, if the cargo is sensitive to rapid acceleration the steady state change indicators 218 assigned to the route characteristics 220 that is likely to involve rapid acceleration, such as a freeway on-ramp, can be greater than the steady state change indicators 218 assigned to the freeway on-ramp when a cargo that is not sensitive to rapid acceleration is being transported.

As a further example, the steady state change indicator module 608 can assign the steady state change indicators 218 to the route characteristics 220 on the potential route 606 for a vehicle transporting fine china along the potential route 606, that are different from the steady state change indicators 218 assigned to the route characteristics 220 on the potential route 606 when the vehicle is transporting pianos or sulfuric acid along the potential route 606. For example, the steady state change indicators 218 can be ten for the route characteristics 220, such as a speed bump, when fine china is being transported and the steady state change indicators 218 can be four for the route characteristics 220 when pianos are being transported.

The steady state change indicator module 608 can also assign the steady state change indicators 218 assigned to the route characteristics 220 based on general information received about the cargo being transported. The steady state change indicator module 608 can, for example, receive information such as whether the cargo is liquid or solid, whether the cargo is fragile, flammable, sensitive to jarring, likely to slide from side to side and how much the cargo weighs. Based on the information received, the steady state change indicator module 608 can determine the steady state change indicators 218 for the route characteristics 220 that will prevent damage to the cargo or to prevent the cargo from spilling out of the vehicle carrying it.

The steady state change indicator module 608 can be implemented, for example, with the first device 102 of FIG. 1. The steady state change indicator module 608 can also be implemented, for example, with the second device 106 of FIG. 1.

Also for example, the steady state change indicator module 608 can be implemented with the navigation system 100 of FIG. 5. The steady state change indicator module 608 can be implemented with the first control unit 512 of FIG. 5 or the second control unit 534 of FIG. 5 assigning the steady state change indicators 218 to the route characteristics 220. The first software 526 or the second software 542 can provide the intelligence for the steady state change indicator module 608.

The navigation system 100 further depicts a modification module 610 for modifying the values assigned to route characteristics 222 for a road or path by the steady state change indicator module 608 to ensure that the values accurately reflect the condition and the needs of the vehicle or person travelling along the road or path. The modification module 610 can modify the steady state change indicators 218 assigned to the route characteristics 220. For example the modification module 610 can modify the steady state change indicators 218 by either adjusting the numbers that represent the likelihood the route characteristics 220 will cause a deviation from a steady state either up or down.

As an example, the deviation from the steady state caused by the route characteristics 220 can be eliminated or lessened by using devices or systems. The modification module 610 can check to see if the person or vehicle using the navigation system 100 is using the devices or systems to eliminate or lessen the deviation from the steady state caused by the route characteristics 220 and can modify the steady state change indicators 218 accordingly. The modification module 610 can check for devices or systems, by for example, performing a search for devices, systems or actions that might affect the deviation caused by the route characteristics 220 or by receiving and processing signals from devices or systems attached to or connected to the navigation system 100.

For example, the modification module 610 can receive an instruction that an automatic toll paying device 612 is being used. For example, the automatic toll paying device 612 can send the instruction to the modification module 610 which can receive the signal and process that signal into modifications of the steady state change indicators 218. The modification module 610 can also detect the use of devices or systems automatically. The modification module 610 can decrease or increase the steady state change indicators 218 to the route characteristics 220 affected by the device.

The modification module 610 can be implemented, for example, with the first device 102 of FIG. 1. The modification module 610 can also be implemented by, for example, the second device 102 of FIG. 1.

Also for example, the modification module 610 can be implemented with the navigation system 100 of FIG. 5. The modification module 610 can be implemented with the first communication unit 516 or the second communication unit 536 receiving the instruction to modify the steady state change indicators 218 or to remove or add the route characteristics 220. The first control unit 512 or the second control unit 534 can modify the steady state change indicators 218 or can remove or add the route characteristics 220. The first software 526 or the second software 542 can provide the intelligence for the modification module 610.

The navigation system 100 also depicts a calculation module 614 for calculating a value for a route that reflects that total deviation from a steady state that a vehicle or person travelling on the route is likely to experience based on the steady state indicators assigned to each segment and intersection on the route. The calculation module 614 can calculate the total steady state change 222 of FIG. 2 for the potential route 606 from the steady state change indicators 218 assigned to the route characteristics 220.

The calculation module 614 can calculate the total velocity deviation 222 for the potential route 606 and for any alternate versions of the potential route 606 that were determined by the potential route module 604. For example, for the potential route 606 that includes only one of the route characteristics 220 and the calculation module 614 can use that one of the route characteristics 220 to determine the total steady state change 222 for the potential route 606. As an example, the potential route 606 can include one unimpeded right turn with one of the steady state change indicators 218 of one and one half. The total steady state change 222 of the potential route 606 with one unimpeded right turn can be one and one half.

As another example, if the potential route 606 includes one of the route characteristics 220 with one of the steady state change indicators 218 of two, another of the route characteristics 220 with another the steady state change indicators 218 of one and one half, and a further of the route characteristics 220 with yet another of the steady state change indicators 218 of three, then the calculation module 614 can calculate the total steady state change 222 to be six and one half.

The calculation module 614 can be implemented, for example, with the first device 102 of FIG. 1. The calculation module 614 can be implemented by the second device 106 of FIG. 2.

Also for example, the calculation module 614 can be implemented with the navigation system 100 of FIG. 5. The calculation module 614 can be implemented with the first control unit 512 or the second control unit 534 calculating the total steady state change 222 of the potential route 606. The first software 526 or the second software 542 can provide the intelligence for the calculation module 614.

The navigation system 700 further depicts a route determination module 616 that determines and selects the selected route 210 of FIG. 2 based on the potential route 606 with the total steady state change 222 that is the lowest. The route determination module 616 can receive the potential route 606 and the total steady state change 222 for the potential route 606 from the calculation module 614. The route determination module 616 can compare the total steady state change 222 for the potential route 606 to the total steady state change 222 for any number of alternative versions of the potential route 606 in order to determine the selected route 210 based on the potential route 606 with the total steady state change 222 that is the lowest and select the selected route 210 for display by the navigation system 100.

For example, the route determination module 616 can receive the first route 324 of FIG. 3, the first total steady state change 346 of FIG. 3, the second route 426 of FIG. 4 and the second total steady state change 460 of FIG. 4. The route determination module 616 can compare the first total steady state change 346 of the first route 324 to the second total steady state change 460 of the second route 426 to determine whether the first total steady state change 346 or the second total steady state change 460 is the lowest.

For example, if the route determination module 616 determines that the first total steady state change 346 is lower than the second total steady state change 460 the route determination module 616 can select the first route 324 as the selected route 210 for the navigation system 100 to navigate along. If the route determination module 616 determines that the second total steady state change 460 is less than the first total steady state change 346 the route determination module 616 can select the second route 426. By using the total steady state change 222 to select the selected route 210 the route determination module 616 can ensure that the selected route 210 that will be used will have the least deviation from the steady state and will therefore be most protective of any cargo being transported.

The route determination module 616 can also determine if the total steady state change 222 that is the lowest is too high for the cargo being transported. The route determination module 616 can determine that the total steady state change 222 is too high based on a cargo sensitivity limit 618 representing the total steady state change 222 that is the largest that the cargo being transported can tolerate or that is the largest that is safe for transport of the cargo.

For example, if potentially dangerous cargo, such as nitro glycerin, is being transported, the cargo sensitivity limit 618 can be used to determine whether or not the selected route 210 is safe to travel. The cargo sensitivity limit 618 can be determined by the route determination module 616 or can be received by the route determination module 616 from another source, such as a module, device or server.

If the route determination module 616 determines that cargo sensitivity limit 618 is lower than a lowest value 620 of the total steady state change 222 then the route determination module 616 can suggest an alternate transportation recommendation 622 for the cargo. The lowest value 620 is the total steady state change 222 of the potential route 606 with the total steady state change 222 that is the lowest. The alternate transportation recommendation 622 can be any alternative to the method of transportation being used by the navigation system 100 or it can be a recommendation that the cargo be transported at a different time of day or night. For example, if the cargo is being transported by truck then the route determination module 616 can suggest the alternate transportation recommendation 622 to be air, train or boat. As a further example, if the cargo sensitivity limit 618 is lower than a lowest value 620 of the total steady state change 222 for the cargo is being transported at eight o'clock in the morning the route determination module 616 can suggest the alternate transportation recommendation 622 that the cargo be transported at a different time, such as noon or ten o'clock at night, in order to avoid deviations from the steady state caused by traffic.

The route determination module 616 can be implemented, for example, with the first device 102 of FIG. 1. The route determination module 616 can also be implemented with the second device 106 of FIG. 1.

Also for example, the route determination module 616 can be implemented with the navigation system 100 of FIG. 5. The route determination module 616 can be implemented with the first control unit 512 or the second control unit 534 determining and selecting the selected route 210 based on the potential route 606 with the total steady state change 222 that is the lowest. The first software 526 or the second software 542 can provide the intelligence for the route determination module 616.

The navigation system 100 further depicts a tie breaking module 624 for determining a route to use based on factors other than a deviation from a steady state when two or more routes are equal in terms of the deviation from the steady state that a vehicle or person travelling along the routes will experience. The tie breaking module 624 can determine the selected route 210 to select based on factors other than the total steady state change 222 if the potential route 606 with the total steady state change 222 that is the lowest cannot be determined.

As an example where the total steady state change 222 of two or more alternative versions of the potential route 606 is equal the tie breaking module 624 can determine the selected route 210 that is the most desirable based on other factors, such as the shortest distance, the shortest time, the lowest amount of fuel used, the least use of freeways, the most use of freeways, the lowest number of toll roads or some combination of such factors. As a further example, where the first total steady state change 346 of the first route 324 and the second total steady state change 460 of the second route 426 are equal the tie breaking module 624 can determine whether to provide navigation along the first route 324 or the second route 426. The tie breaking module 624 can determine to use the first route 324 or the second route 426 by determining, for example, which has the shortest distance or which takes the least amount of time to travel.

The tie breaking module 624 can be implemented, for example, with the first device 102 of FIG. 1. The tie breaking module 624 can also be implemented with the control unit 508 determining which factor to use and determining the route selected 210 along which to provide navigation based on that factor. The software 512 can provide the intelligence from the tie breaking module 624.

Also for example, the tie breaking module 624 can be implemented with the navigation system 100 of FIG. 5. The tie breaking module 624 can be implemented with the first control unit 512 or the second control unit 534 determining which factor to use and determining the selected route 210 along which to provide navigation based on that factor. The first software 526 or the second software 542 can provide the intelligence for the tie breaking module 624.

The navigation system 100 further depicts a navigation module 626 for providing directions explaining how to navigate along a road or path selected by the route determination module 616 or the tie breaking module 624. The navigation module 626 can provide turn by turn directions explaining how to travel on the selected route 210 from the current location 212 to the destination 214. The navigation module 626 can provide directions in order to ensure that a vehicle or person travels along the selected route 210.

The navigation module 626 can be implemented, for example, with the first device 102 of FIG. 1. The navigation module 626 can also be implemented with the second device 106 of FIG. 1.

Also for example, the navigation module 626 can be implemented with the navigation system 100 of FIG. 5. The navigation module 626 can be implemented with the first control unit 512 or the second control unit 534 providing directions explaining how to navigate the selected route 210. The first software 526 or the second software 542 can provide the intelligence for the navigation module 626.

The navigation system 100 further depicts a revising module 628 for determining whether any conditions on the selected road or path have changed and for determining what the total effect of the conditions along the road or path are in light of the changed conditions. The revising module 628 can determine whether there is a changed conditioned that affects the route characteristics 220 and thereby affects the steady state indicators 218 and the total steady state change 222 for the selected route 210.

If there is a changed condition that affects the route characteristics 220 the revising module 628 can revise the steady state change indicators 218 of the route characteristics 220 and can calculate the total steady state change 222 for the selected route 210 based on the changed conditions. The revising module 628 can also send an instruction to the route determination module 616 to verify the total steady state change 222 of the selected route 210 against the total steady state change 222 of the potential route 606 and any number of alternatives of the potential route 606 in order to determine whether the selected route 210 still has the total steady state change 222 that is the lowest and to determine if the total steady state change 222 is still below the cargo sensitivity limit 618.

For example, the revising module 628 can receive information regarding a change to the route characteristics 220 on the selected route 210, such as a changed traffic condition, a road closure, or debris spilled in the road. The revising module 628 can revise the steady state change indicators 218 of the route characteristics 220 based on how changes to the route characteristics 220 affect the deviation from the steady state.

For example, if a changed traffic condition will result a complete stop on a portion of the selected route 210 including the route characteristics 220 that normally would not require a stop the steady state change indicators 218 assigned to the route characteristics 220 can be changed to reflect the changed traffic condition.

The revising module 628 can, recalculate the total steady state change 222 of the selected route 210 based on the revision of the steady state change indicators 218. For example, if there is an accident causing cars to stop on the portion of the selected route 210 containing the route characteristics 220 that does not normally require stopping with the steady state change indicators 218, such as one, the revising module 628 can revise the steady state change indicators 218 to have a numerical indicator, such as six, to reflect the changed condition. The revising module 628 can recalculate the total steady state change 222 for the selected route 210 using the revision of the steady state change indicators 218 to six instead of one.

The revising module 628 can also determine a waypoint 630 that the revising module 628 can direct a vehicle or person to while waiting for the effects of the changed conditions to abate if, because of the changed conditions, the total steady state change 222 for selected route 210 is greater than the cargo sensitivity limit 618. For example, the revising module 628 can receive information regarding a change to the route characteristics 220 on the selected route 210, such as stopped traffic along the selected route 210 that increases the total steady state change 220 for the selected route 210 to a value above the cargo sensitivity limit 618. The revising module 628 can determine the waypoint 630 along the route selected 210 that vehicle or person transporting the cargo can travel to until the changed conditions have abated so that the total steady state change 220 for the selected route 210 is below the cargo sensitivity limit 618.

The revising module 628 can be implemented, for example, with the first device 102 of FIG. 1. The revising module 628 can also be implemented with the second device 106 of FIG. 1. Also for example, the revising module 628 can be implemented with the navigation system 100 of FIG. 5. The revising module 628 can be implemented with the first communication unit 516 or the second communication unit 536 receiving information regarding the changed condition involving the route characteristics 220.

The first control unit 512 or the second control unit 534 can revise the steady state change indicators 218 assigned to the route characteristics 220 based on the changed condition and can calculate the total steady state change 222 for the route. The first software 526 or the second software 542 can provide the intelligence for the revising module 628.

The navigation system 100 further depicts a speed module 632 for suggesting a speed to use when travelling on a road or path what will minimize potential harm to any cargo that a vehicle or person might be carrying. The speed module 632 can calculate a suggested speed 634 when approaching or traveling portions of the selected route 210 in order to minimize the total steady state change 222 for the selected route 210. The speed module 632 can recommend the suggested speed 634 to minimize or eliminate deviations from the steady state caused by the route characteristics 220.

For example the speed module 632 can recommend the suggested speed 634 that is lower than the posted speed limit in order to minimize or eliminate the effects of braking. The speed module 632 can also, for example, recommend gradually slowing at a certain distance before a stop or slowing to match the speed of slow traffic ahead in order to reduce the effects of braking. The speed module 632 can also recommend a rate of slowing. For example, the speed module can recommend slowing at a rate of one mile per hour every minute or one mile per hour every one hundred feet.

The speed module 632 can also recommend the suggested speed 634 for a corner or a curve which can minimize the deviation from the steady state caused by travelling through the corner. For example, the speed module 632 can recommend the suggested speed 634 to use when travelling through the corner based on the type of vehicle being driven, the cargo being used, the sharpness of the corner or the speed limit.

The speed module 632 can be implemented, for example, with the first device 102 of FIG. 1. The speed module 632 can also be implemented with the second device 106 of FIG. 1.

Also for example, the speed module 632 can be implemented with the navigation system 100 of FIG. 5. The speed module 632 can be implemented with the first control unit 512 or the second control unit 534 determining the suggested speed 634 for the route characteristics 220 and communicating the suggested speed 634. The first software 526 or the second software 542 can provide the intelligence for the speed module 632.

It has been discovered that the navigation system 100 can efficiently and effectively determine the selected route 210 from the current location 212 to the destination 214 that is least harmful to cargo and can provide navigation along the selected route 210. It has been unexpectedly found that by selecting the selected route 210 based on the total steady state change 222 calculated for the route the navigation system 100 can provide navigation that minimizes harm to cargo being carried by a vehicle or a person. It has been unexpectedly found that the calculation of the total steady state change 222 from the steady state change indicators 218 to determine the selected route 210 provides navigation along the selected route 210 that is least harmful to cargo.

It has also been discovered that the navigation system 100 can facilitate the maintenance of a steady state that protects cargo by calculating a recommended speed for portions of the selected route 210. It has also been unexpectedly found that the navigation system 100 can provide navigation that adjusts to new conditions that could endanger cargo by revising the steady state change indicators 218 assigned to the route characteristics 220 to reflect changed conditions or by providing the waypoint 630 where the vehicle or person transporting the cargo can wait for the changed conditions to abate.

The physical transformation of the selected route 210 determined based on the steady state change indicators 218 assigned to route characteristics 220 on the selected route 210 results in movement in the physical world, such as people or vehicles using the navigation system 100 with an alternative route determination mechanism, based on the operation of the navigation system 100. The navigation system 100 is able to represent a course between two points in the real world as the selected route 210. The navigation system 100 can determine the selected route 210 based on real world characteristics, represented by route characteristics 220, by using the steady state change indicators 218 assigned to the route characteristics 220 in order to evaluate the desirability of the selected route 210. By selecting the selected route 210 and providing instructions directing movement along the selected route 210, the navigation system 100 results in movement in the physical world.

As the movement in the physical world occurs, the movement itself creates additional information that is converted back to the steady state change indicators 218 assigned to the route characteristics 220 which affect the determination of the selected route 210 for the continued operation of the navigation system and to continue the movement in the physical world. By checking for changed conditions in the real world and revising the steady state change indicators 218 assigned to the route characteristics 220 based on these changed conditions the navigation system 100 is able to direct the movement of people or vehicles in response to changes in real world conditions. The navigation system 100 also directly affects the movement of people or vehicles in the real world by using its speed module 632 to suggest the speed at which people or vehicles should move through the world at specific locations.

Thus, it has been discovered that the navigation system of the present invention furnishes important and heretofore unknown and unavailable solutions, capabilities, and functional aspects for providing an alternative route determination mechanism.

The navigation system 100 describes the module functions or order as an example. The modules can be partitioned differently. For example functions of the steady state change indicator module 608 can be carried out by the route determination module 616, or vice versa. Each of the modules can operate individually and independently of the other modules.

The navigation system 100 can be partitioned between the first device 102 of FIG. 5 and the second device 106 of FIG. 5. For example, the navigation system 100 can be partitioned into the functional units of the first device 102, the second device 106, or a combination thereof.

Figure 7:
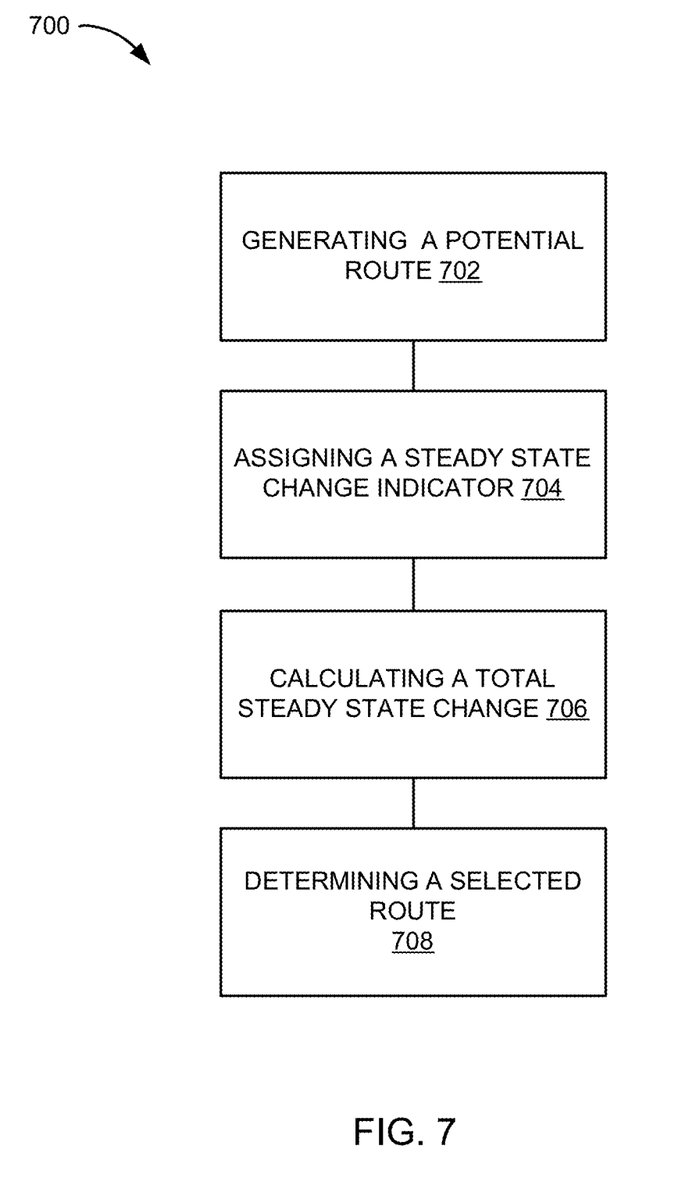
FIG. 7 is a flow chart of a method of operation of a navigation system in a further embodiment of the present invention.

Referring now to FIG. 7, therein is shown a flow chart of a method 700 of operation of a navigation system in a further embodiment of the present invention. The method 700 includes: generating a potential route from a current location to a destination in a block 702; assigning a steady state change indicator to a route characteristic of the potential route for maintaining a steady state of a vehicle in a block 704; calculating a total steady state change for the potential route based on the steady state change indicator in a block 706; and determining a selected route based on the potential route with the total steady state change that is the lowest for displaying on a device in a block 708.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing navigation systems with an alternative route determination mechanism fully compatible with conventional manufacturing methods or processes and technologies. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims.

All matters hithertofore set forth herein or shown in the accompanying drawings are to be interpreted in an illustrative and non-limiting sense.

What is claimed is:

1. A method of operation of a navigation system comprising:
    generating a potential route from a current location to a destination;
    assigning a steady state change indicator to a route characteristic of the potential route for maintaining a steady state of a vehicle;
    calculating a total steady state change for the potential route based on the steady state change indicator; and
    determining a selected route based on the potential route with the total steady state change that is the lowest for displaying on a device.

2. The method as claimed in claim 1 further comprising revising the steady state change indicator for the selected route based on a changed condition for the route characteristic of the selected route.

3. The method as claimed in claim 1 further comprising determining a waypoint based on a changed condition for the route characteristic of the selected route.

4. The method as claimed in claim 1 wherein:
    generating the potential route includes generating a first route segment and a first intersection;
    assigning the steady state change indicator includes assigning a first steady state change indicator to the first route segment and a second steady state change indicator to the first intersection; and
    calculating the total steady state change for the potential route includes adding the first steady state change indicator and the second state change indicator.

5. The method as claimed in claim 1 wherein determining the selected route includes determining the selected route with the total steady state change less than a cargo sensitivity limit.

6. A method of operation of a navigation system comprising:

generating a potential route from a current location to a destination;

assigning a steady state change indicator to a route characteristic of the potential route for maintaining a steady state of a vehicle;

calculating a total steady state change for the potential route based on the steady state change indicator;

determining a selected route based on the potential route with the total steady state change that is the lowest for displaying on a device; and calculating a suggested speed for the selected route for maintaining a steady state while traversing the selected route.

7. The method as claimed in claim 6 further comprising:
determining a cargo sensitivity limit less than a lowest value of the total steady state change; and
suggesting an alternate transportation recommendation for the cargo sensitivity limit.

8. The method as claimed in claim 6 further comprising:
detecting a change to the route characteristic of the selected route;
revising the steady state change indicator for the selected route based on the change for the route characteristic; and
updating the selected route based on a revision to the steady state change indicator.

9. The method as claimed in claim 6 further comprising:
detecting an automatic toll collection device; and
revising the steady state change indicator for the route characteristic based on the use of the automatic toll collection device.

10. The method as claimed in claim 6 further comprising:
detecting a change to the route characteristic of the selected route;
revising the steady state change indicator for the selected route based on the change for the route characteristic;
recalculating the total steady state change for the selected route; and
selecting a waypoint based on a recalculation of the total steady state change.

11. A navigation system comprising:
a control unit for generating a potential route from a current location to a destination;
a steady state change indicator module, coupled to the control unit, for assigning a steady state change indicator to a route characteristic of the potential route for maintaining a steady state of a vehicle;
a calculation module, coupled to the steady state change indicator module, for calculating a total steady state change for the potential route based on the steady state change indicator; and
a route determination module, coupled to the calculation module, for determining a selected route based on the potential route with the total steady state change that is the lowest for displaying on a device.

12. The system as claimed in claim 11 further comprising a revising module, coupled to the route determination module, for revising the steady state change indicator for the selected route based on a changed condition for the route characteristic of the selected route.

13. The system as claimed in claim 11 further comprising a revising module, coupled to the route determination module, for determining a waypoint based on a changed condition for the route characteristic of the selected route.

14. The system as claimed in claim 11 wherein:
the control unit is for generating a first route segment and a first intersection;
the steady state change indicator module is for assigning a first steady state change indicator to the first route segment and a second steady state change indicator to the first intersection; and
the calculation module is for adding the first steady state change indicator and the second state change indicator.

15. The system as claimed in claim 11 wherein the route determination module is for determining the selected route with the total steady state change less than a cargo sensitivity limit.

16. The system as claimed in claim 11 further comprising a speed module, coupled to the route determination module, for calculating a suggested speed for the selected route for maintaining a steady state while traversing the selected route.

17. The system as claimed in claim 16 wherein:
the control unit is for determining a cargo sensitivity limit less than a lowest value of the total steady state change; and
the route determination module is for suggesting an alternate transportation recommendation for the cargo sensitivity limit.

18. The system as claimed in claim 16 further comprising:
a revising module, coupled to the route determination module, for detecting a change to the route characteristic of the selected route; and
wherein:
the calculation module is for revising the steady state change indicator for the selected route based on the change for the route characteristic; and
the route determination module is for updating the selected route based on a revision to the steady state change indicator.

19. The system as claimed in claim 16 wherein:
the control unit is for detecting an automatic toll collection device; and
further comprising:
a modification module, coupled to the control unit, for revising the steady state change indicator for the route characteristic based on the use of the automatic toll collection device.

20. The system as claimed in claim 16 further comprising:
a revising module, coupled to the route determination module, for detecting a change to the route characteristic of the selected route; and
wherein:
the calculation module is for revising the steady state change indicator for the selected route based on the change for the route characteristic;
the route determination module is for recalculating the total steady state change for the selected route; and
the control unit is for selecting a waypoint based on a recalculation of the total steady state change.

* * * * *